US009815319B2

(12) United States Patent
Cooper (10) Patent No.: US 9,815,319 B2
(45) Date of Patent: Nov. 14, 2017

(54) PAINT CAN HOLDERS

(71) Applicant: Mark A. Cooper, Sequim, WA (US)

(72) Inventor: Mark A. Cooper, Sequim, WA (US)

( * ) Notice: Subject to any disclaimer, the term of this patent is extended or adjusted under 35 U.S.C. 154(b) by 0 days.

(21) Appl. No.: 15/173,646

(22) Filed: Jun. 4, 2016

(65) Prior Publication Data

US 2016/0368312 A1    Dec. 22, 2016

Related U.S. Application Data

(60) Provisional application No. 62/181,124, filed on Jun. 17, 2015.

(51) Int. Cl.
| | |
|---|---|
| *B44D 3/14* | (2006.01) |
| *B44D 3/12* | (2006.01) |
| *B65D 25/28* | (2006.01) |
| *F16B 1/00* | (2006.01) |

(52) U.S. Cl.
CPC .............. *B44D 3/14* (2013.01); *B44D 3/123* (2013.01); *F16B 2001/0035* (2013.01)

(58) Field of Classification Search
CPC ........... B44D 3/14; B44D 3/123; B65D 25/28
USPC ...... 294/27.1, 29, 30, 31.1, 33, 34; 220/695, 220/696, 697, 759; 16/422, 425
See application file for complete search history.

(56) References Cited

U.S. PATENT DOCUMENTS

| | | | | |
|---|---|---|---|---|
| 114,860 | A * | 5/1871 | Robbins ................... | A47J 45/10 220/759 |
| 2,048,022 | A * | 7/1936 | Orr ....................... | B65D 25/282 220/751 |
| 5,203,471 | A * | 4/1993 | Widman ............. | A47G 23/0266 220/755 |
| 5,377,863 | A * | 1/1995 | Widman ................ | B44D 3/123 220/695 |
| 5,482,339 | A * | 1/1996 | Chishko, Jr. ............. | B44D 3/14 220/759 |
| D372,844 | S * | 8/1996 | Nunes ........................... | D7/622 |
| 5,853,157 | A * | 12/1998 | O'Donnell ............. | B44D 3/123 211/65 |
| 6,266,849 | B1 * | 7/2001 | Petit ......................... | B44D 3/14 16/425 |
| D456,578 | S * | 4/2002 | Smith .......................... | D32/54 |
| 6,863,191 | B2 * | 3/2005 | Kesling .................. | B44D 3/123 220/697 |
| 7,604,270 | B1 * | 10/2009 | McCarthy .......... | B65D 25/2829 16/422 |

(Continued)

*Primary Examiner* — Paul T Chin (74) *Attorney, Agent, or Firm* — Jacques M. Dulin, Esq.; Innovation Law Group, Ltd.

(57) ABSTRACT

Holder devices for bulk paint cans comprising planar ergonomic handles having a C-shaped "jaw" that engages only the conventional upper, lip rim of a paint can so that the can may be held at a conveniently inclined angle in one hand during brush painting to permit unobstructed access to the paint. The jaw is common for all sizes of paint cans, as the ring-type can lip is common in its radial dimension and thickness. A slot with optional keeper is provided to retain bails. Three embodiments are shown: a Universal type and two dedicated types, for Quart and Gallon cans, respectively. A magnet provided on the holder retains a paint brush oriented over the paint contents to catch drips. The transition section of the holder is flat to provide a surface on which the holder can be stood upright, and as a hammer to reseal the paint can lid.

19 Claims, 7 Drawing Sheets

(56) References Cited

U.S. PATENT DOCUMENTS

2004/0173627 A1\* 9/2004 Kesling .................. B44D 3/123
 220/756
2014/0265382 A1\* 9/2014 Bajuyo .................. A45F 5/021
 294/15

\* cited by examiner

PAINT CAN HOLDERS

FIELD

Holder devices for paint cans, comprising one-piece ergonomic handles that hook-over and engage only the upper, lid rim of a paint can so that the filled or partly filled paint can may be held by one hand of a painter during painting. The inventive holder devices are provided in three types: Type UC a universal embodiment; and two dedicated embodiments, Type QL and Type GM, to engage and retain two basic sizes of paint can: Size Q/L for Quart (0.946 Liter) or Liter (1.057 US Quarts) cans; and Size G/M for US Gallon (3.78 Liters) or Metric (2, 2.5, 3, 4 and 5 Liter metric sizes). The jaw portion of the holder that engages the rim is common for all can sizes as the lip of all these size cans is common. For US Gallon and multi-Liter metric size cans having a bail, a bail slot is provided in the holder to permit the can to be tilted at an angle providing brush access to the paint while keeping the bail out of the way, and as secondary, safety retainer. The jaws are oriented to provide a tilt to the can when held, which permits easy access for the brush to dip into the paint. As an option, a magnet is provided on the head of the holder device to retain a paint brush with the wet bristles oriented over the can paint contents to catch any drips.

BACKGROUND

Handling a can of paint is one of the key logistical problems during painting with a brush. While the can may be placed on a flat surface, such as the floor, a table or a ladder shelf, none of these locations is particularly ready at hand during brush painting. In the case of quart and liter cans, they are large enough in size that they cannot be easily grasped in one hand around their circumferential side wall; that is, the can diameter is simply too large to be grasped in one normal hand (unless the painter has unusually large hands). In contrast, pint cans are sufficiently small in diameter that grasping like a water glass is not a problem; their volume is so small that holding the can is not fatiguing. However, for larger quart and liter cans, their size and weight typically requires that the can be grasped between the thumb on the lip and two or three fingers under the bottom and one or two on the side. While this holding position permits access of the paint brush to the can contents, it is quickly extremely tiring, not only to the hand, but also to the arm muscles. In addition, the brush dipping must be precise in order to not mistakenly cover the thumb or hand with paint.

Larger cans, such as US gallon and multi-liter metric size paint cans are provided with a wire bail handle, in which the wire is on the order of 1-2 mm thick. These cans are held by the bail itself, often with the aid of a ½" wide plastic sheath, in which the bail snaps, that is cradled in the palm of a closed, or partially closed, hand. The resulting position is that the can of paint is held vertically by the bail. That position poses a problem of dipping the brush because both the hand holding the bail and the bail itself block access to the paint in the can. In addition, since brush painting from a gallon or multi-liter-size can typically involves use of a wider brush than used for a quart or liter can, the "hand and bail in the way" limitation presents a significant ease of access problem. A gallon can full of paint is also very heavy and hard to hold for extended period of time.

These paint can handling problems are exacerbated when the painter must apply paint to elevated surfaces. Typically the painter is perched on a ladder, and must take care to balance properly for safety and reach of the work surface to be painted. In the case of extension ladders, the typical solution for holding a gallon or multi-liter type can, is to use an "S" type double hook, one hook end of which is engaged over a ladder rung and the other engages the paint can bail. However, often the can is engaged at below waist level of the painter, as the angle between the ladder and the wall against which the ladder is propped must be sufficient to provide clearance for the diametrical width of the can of paint. Painting in such positions requires repeated twisting of the painter's body in order to dip the brush in the can hung under the ladder to avoid the rung and bail so as to dip the brush and withdraw it without dripping or grazing the ladder.

A number of attempts to address such problems are presented in the prior art, none of which have proven sufficiently useful to achieve commercial success. US 2002/0145001 is directed to a clamp-ring into which a tapered receptacle for paint is inserted. The ring includes diametrically opposed "arms" that are received in notches of a semicircular base element, to which an angled handle is attached. The handle includes an extension rod, the upper end of which includes curved flanges that fit the user's arm when the user grasps the handle. The flanges are strapped to the user's arm. This device does not appear adapted for use with paint cans having bails, as it essentially provides a bail system in which the bail has an extension rod extending outwardly from the center of the semi-circular base element US 2002/0125385 discloses a gallon paint can holder comprising an inverted L-shaped handle having a flange that rests on the top of a paint can. The stem of the L extends half-way down the paint can and terminates in horizontal (transversely oriented) curved flanges that fit the curved side of the can. A shoulder on which the can bail rests is provided on the outside of the holder at the level of the flange so that the can is retained by the stem, being wedged by the bail. The inverted foot of the L extends over the can contents and serves as a hand-hold.

U.S. Pat. No. 6,863,191 shows a paint can bail and brush holder comprising a generally oval body, the lower end of which includes an elongated leg that fits under the underside of a paint can lip. The outer surface of the body includes a horizontal bail slot, while the inner surface includes a prong or hook on which a paint brush is hooked. This patent does not include an illustration of whether the bail holder can also be grasped in order to hold the can of paint, but to do so would involve engaging fingers both above and below the brush hook with the bail touching the back of the hand, in which case the brush would not be able to be hooked on the brush hook. More likely, the user would just hold the can by the bail with two fingers on each side of the bail holder. This device is apparently intended as an aid to pouring paint from the can without interference from the free-swinging bail.

U.S. Pat. No. 7,387,323 is directed to a carrier for paint cans having a bail. The carrier includes a vertical member placed against the outside of the can, and having a radial lip with an upturned inner flange that fits under the bottom of the can engaging the can bottom rim and fitting in the can bottom recess. The outer surface of the vertical member includes a plurality of steps on which the can bail is engaged in order to secure the vertical member tightly against the can. The upper end of the vertical member includes an inward curve that is scalloped to provide a hand hold. This device is for carrying sealed cans from place to place by a large handle as compared to trying to carry a heavy can by the bail.

U.S. Pat. No. 8,413,839 is directed to a container carrying aid which sandwiches the can bail and is contoured on its inner surface to provide a more comfortable rest for the inner (thumb) edge of the hand. The user places his hand against the side of the can, drops the bail engaged in the aid onto the first finger and thumb web, then wraps the thumb over the top of the aid. That design is said to transfer torque from the hand to the bail when lifting. In a second embodiment, the user grasps the bottom of the can with several fingers, and the aid includes a pivoted C-shaped arm that engages the wrist or the back of the hand.

Accordingly, there is an unmet need to provide paint can holders that are universally useful for a wide range of US and Metric-sized paint cans, both with and without bail handles, which have an ergonomic handle to permit holding naturally like a tool, which present complete access to the paint contents without blocking interference of a bail, which keep the hand and fingers of the painter completely off the can, and which are simple, inexpensive one-piece construction.

THE INVENTION

Summary of the Invention

The invention relates to holder devices for bulk liquid (non-aerosol) paint cans having pry-off lids, which holders comprise generally planar, one-piece ergonomic handles having a "jaw" portion that hooks-over and engages only the upper, lid rim of a paint can so that the filled or partly filled paint can may be grippingly held by one hand of a painter during brush painting. The inventive paint can holder devices are configured in several embodiments to engage and hold two fundamental sizes of paint cans: 1) cans not having a bail, such as Size QL for Quart (0.946 Liter) or Liter (1.057 US Quarts) or multi-liter (2 and 2.5 Liter size) cans; and 2) cans having a bail, such as Size GM for US Gallon (3.78 Liters) or Metric (2, 2.5, 3, 4 and 5 Liter metric sizes). The inventive holders may be used with either metal or plastic paint cans having a conventional formed, ring-type lip for a compression lid, that is, a lid that has a bead which is pressed into a U-shaped groove of the lip.

A generally C-shaped jaw portion of all embodiments of the inventive holders is common for both sizes of paint cans, as the ring-type lip of all these sizes of cans is common in its radial dimension. Generally, the jaw mouth or opening is wide enough to slip over the vertical height of the can ring-type lip, but not over the width of the ring-type lip. The throat of the jaw has a depth on the order of the width of the lip, and the back surface of the jaw is just wide enough to receive the width of the lip so that the lip is locked into the jaw. The inner, upper surface of the jaw is arcuate so that the holder can be rotated around the lip to engage the lip in the back of the jaw structure. In cases where the ring-type lip may be larger or small than the current US standard, one skilled in the art will recognize that is straight-forward to adjust the size of the C-shaped jaw portion to fit the particular can lip configuration and dimension.

For the US Gallon and multi-Liter metric size cans having a bail, a bail slot is provided in the holder. The combination of the jaw at one end of the holder and the bail slot, disposed at the other end and on the opposite side of the holder handle portion, permits gripping the inventive holder to hold and carry the paint can at an angle, with the center of gravity of the can including its paint contents being vertically below the center of the holder. This permits the can of paint to be held at an angle providing un-obstructed brush-dipping access to the paint while keeping the bail out of the way. Secondarily, the bail slot acts as a secondary, safety retainer in the unlikely event the paint can lip or jaw structure of the holder fails. Likewise, the holder for the quart/liter cans includes a jaw oriented to provide a tilt to the can when held, which permits easy access for the brush to dip into the paint.

By way of example of the principles of the invention, three embodiments are shown: A. A universal configuration, called herein "Type UC", that is generally "J-shaped", or in an alternate embodiment, Oval-shaped, when viewed from its left side, having the jaw disposed in the up-turned, forward "hook" portion, while the bail slot is disposed adjacent the upper end of the vertical stem (hand-grip) portion; this universal configuration permits retaining either a Quart can or a Gallon can using the bail hook; B. a dedicated Quart/Liter can holder, called herein "Type QL", that is generally "C-shaped" when viewed from its left side, having the jaw disposed in the upper "head" end of the C; and C. a dedicated Gallon/Multi-Liter can holder, called herein "Type GM", that is generally "J-shaped" when viewed from its left side, having the jaw disposed in the up-turned, forward "hook" portion, while the bail slot is disposed adjacent the upper end of the vertical stem, hand-grip, portion.

In the case of use of the Types UC and GM holders for holding gallon/multi-liter cans, upon hooking the jaw over the can lip the holder is rotated back about 45° to be positioned above the tilted paint can. In the case of the Type QL holder in use with quart/liter cans, upon hooking the jaw over the can lip, the holder is rotated back about 60° to be positioned to one side of the can. In all cases, the inventive holders permit easy brush-dipping access to the paint in the can. All of the inventive holder embodiments involve a simple rotational motion to engage the jaw to the lip of the can.

The inventive holders are constructed having a width (or thickness) sufficient to prevent the can from pivoting from side to side while being held, e.g., on the order of ⅜" to 1" width. That is, the width of the inventive holder provides a substantial purchase along the inner lip of the can and the outer bead rim (arcuate length), so that there is area contact, rather than point contact with the can lip and rim. Contributing to this feature, the inner surface of the inner and outer jaws may be curved in an arc corresponding approximately to the radius of the paint can being held. In an important alternate embodiment, the outer side edges of the jaw configuration project 1-2 mm beyond the inner surface of the jaw to provide two spaced contact points with the inner lip and outer bead rim of the can. This design is easily accomplished by relieving the throat of the jaw by 1-2 mm adjacent the points of contact with the can inner lip and outer bead, respectively.

In overall configuration, the dedicated Type QL holder is generally C-shaped, while the Type GM and UC are J-shaped or Oval (when viewed from the left side). As an option, a magnet is provided on the head of the holder device to retain a paint brush with the wet bristles oriented over the can's paint contents, to catch any drips. An additional option is that the bottom of all embodiments of the several types of the inventive holder, when oriented vertically, is configured to be flat to provide the dual function of a flat surface on which the holder can be stood upright, and may also be used as a hammer to reseal the paint can lid.

In a first dedicated embodiment, the Type QL holders are generally "C" shaped in vertical elevation with the jaw portion located at the upper "head" of the C. The medial portion is elongated and relatively straight, ⊏, and of length long enough to comfortably fit the palm-width of a man's hand, e.g., on the order of 4-6" in length, thereby forming a hand-grip. The lower "foot" portion or "curl" portion of the C-shape is provided to assist in retaining the user's hand on the medial portion. That is, the foot portion is long enough to form a "hook" which prevents the holder from slipping off or out of the user's hand. The bottom surface of the C is generally flattened to provide a standing and striker surface as noted above. The edges are chamfered for comfort, or may be ergonomically formed on the inside surface with scallops to fit the palm-face of the fingers of a user and on the outside to receive the user's thumb.

In the second dedicated embodiment, Type GM, in a first embodiment, the holders are generally "J" shaped when seen from the left side of the holder (backward "J" when seen from the right). The vertical, hand-grip, stem portion of the J is flared outwardly, that is back to the right, at its upper "foot" end in order to include a bail slot (facing downwardly) in its outer surface. The foot includes a magnet positioned on its upper surface. The flair positions the plane of the magnet so that it points toward the interior of the paint can when the holder is in use. The jaw structure is located in the head portion, adjacent the top of an upward curving neck, being inset in the outer, "forward" face thereof. The length of the stem, between the outward flare of the foot and the commencement of a transition section joining the neck portion, is on the order of 4-6" in length, long enough to comfortably receive the palm of the hand, thereby forming a hand-grip. As with the QL embodiment, the stem portion may be shaped for more ergonomic hand-grip.

The third universal embodiment, Type UC, is also generally "J" shaped (or in a second embodiment described below, "Oval shaped") when seen from the left side of the holder. Its configuration features are essentially similar to the Type GM holders. In addition, for more secure use with Q/L cans, the upper foot end of the J includes a projection, or "beak" that functions to engage and act as a stop for the index finger of the painter, so that the user's hand does not slip off the stem, particularly when being used with Q/L size paint cans. The jaw is configured to engage the lips of either the size Q/L or G/M paint cans and rotate back only about 30°-45° to be in the use position. As in the Type GM a bail slot and magnet is provided in the upper flared-back portion of the foot. It should also be understood that the Type GM holder can be used to engage and retain a size Q/L paint can.

It should be understood that a wide range of shapes within the general description of "C" and "J" may be made without departing from the principles of the invention. In addition, while the embodiments shown are single-piece construction, it should be understood that the holder implement may be constructed of multiple parts. The material of construction of the inventive holders may be any suitable metal, aluminum being preferred, or of any durable, robust plastic, such as an acrylate, acetyl, UHMW urethane, HDPE, ABS, or the like. The cross-section profile of the inventive holders may be generally rectangular, with chamfered edges and ergonomically contoured in the hand-grip stem portion. In the alternative, the cross-section may be relieved, such as I-beam shaped, and may include apertures transversely through from side wall to side wall for weight reduction, or to provide an aperture to receive a hook or nail in order to hang up the holder when not in use. The magnet is oriented on the foot of the holder on a plane whose angle intercepts the plane of the surface of the paint in the can. A brush ferrule, being a magnetically-attracted metal, is retained by the magnet with the brushes oriented to drip into the can.

BRIEF DESCRIPTION OF THE DRAWINGS

The invention is described in more detail with reference to the drawings, in which:

FIGS. 8A-8B are isometric views of the J-shaped Type UC holder in use with a size Q/L paint can; FIGS. 9A-9D are isometric views of the J-shaped Type UC holder in use with a size G/M paint can.

DETAILED DESCRIPTION OF THE INVENTION AND MODES OF USE

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and an embodiment of one feature may be shown in one drawing, and another feature will be called out in another drawing.

Figures 1, 2:
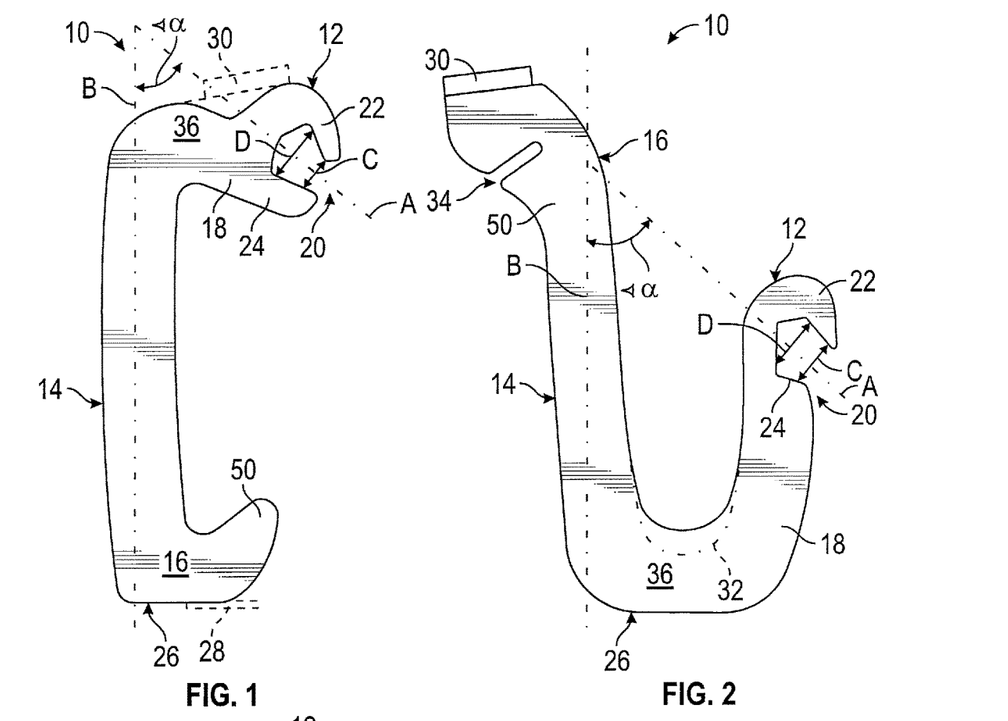
FIG. 1 is an outline (plan view) drawing of the first, dedicated, Type QL embodiment of the inventive paint can holder, showing in phantom an alternative contour of the foot for a brush-holding magnet.
FIG. 2 is an outline (plan view) drawing of the second, Type GM embodiment of the inventive paint can holder, showing in phantom an alternative contour of the stem-to-neck transition section showing a longer hand-grip portion.

FIG. 1 illustrates the first, dedicated, Type QL, embodiment of the inventive paint can holder 10, which comprises a head portion 12, an intermediate stem or hand-grip portion 14 and a foot portion 16. Each portion is connected by continuous transition portions, together being characterized as generally forming a C-shaped configuration. The head portion 12 is connected to the stem portion 14 by a curved neck section 18, which serves to orient the axis A of the opening of the jaw structure 20 at an oblique angle with respect to the longitudinal axis B of the stem 14. An upper lip 22 is spaced from a lower lip 24 of the jaw 20 by a width C which is wide enough to permit fitting over the vertical height or thickness of the lip of the paint can when the holder 10 is rotated clockwise (when viewing FIG. 1) so that the plane of the upper surface of the paint can lip is parallel to the axis A. The throat width D is only slightly wider than the radial width of the paint can lip so that when the holder 10 is rotated back counter-clockwise, the lip is wedged between the projections 22 and 24 at the back of the jaw (back of the throat), and lip 24 contacts the outer surface of the paint can. This locks the paint can lip into the jaw 20 of the holder 10. The foot 16 includes an upwardly directed curl 50 which forms a stop so the hand does not slip off the hand-grip stem 14 while holding the paint can with the holder 10. The outer bottom surface 26 of the foot 16 is flat to provide a striking surface (hammer) for re-seating the paint can lid onto the paint can; of course, the holder is removed from the can lip before re-seating the lid. An optional flange 28, preferably made of metal, projecting from the front bottom edge of the foot 16 may be provided as a pry for removing the lid from the can, i.e., to open the can. As shown in dash-dot lines, the head 12 may be contoured to provide a flat surface to retain a magnet 30, oriented with the plane of its surface intersecting the interior of the paint can so that a brush retained magnetically at its ferrule will be positioned to drip into the open can.

FIG. 2 illustrates the second, dedicated, Type GM, embodiment of the inventive paint can holder 10, which comprises a head portion 12, an intermediate stem or hand-grip portion 14 and a foot-portion 16. Each portion is connected by continuous transition section, together being characterized as generally forming a backward J-shaped configuration (as seen in this figure, being from the right side of the holder 10). As such, as compared to the FIG. 1 embodiment, the orientation of parts is upside-down, with the neck down and the foot up. As with the first embodiment above, the head portion 12 (elongated as compared to the embodiment of FIG. 1) is connected to the stem portion 14 by a curved neck section 18, which serves to orient the axis A of the opening of the jaw structure 20 at an oblique angle with respect to the longitudinal axis B of the stem 14. As shown in phantom at 32, the thickness of the neck portion 18 may be varied to provide a longer hand-grip stem portion 14 to accommodate a larger hand. In the head 12, an upper projection (or lip) 22 is spaced from a lower projection (or lip) 24 by a width C which is wide enough to permit fitting over the vertical height or thickness of the lip of the paint can when the holder 10 is rotated clockwise (when viewing FIG. 2) so that the plane of the upper surface of the paint can lip is parallel to the axis A. The throat width D is only slightly wider than the radial width of the paint can lip so that when the holder 10 is rotated back counter-clockwise, the lip is wedged between the upper lip projection 22 and the lower jaw projection 24, locking the paint can lip into the holder 10.

In this second embodiment of the holder 10, the upper end (as shown in FIG. 2) of the stem portion 14 is flared backwards (to the left, away from the head portion) to form an abbreviated "foot" portion 16, the downwardly-curving "outer" surface of which includes a bail slot 34. The bail slot is dimensioned just wide enough to frictionally engage a bail. It may be configured to provide a "snap-into" engagement of the bail to retain the holder in its use position (see FIG. 7). That is, after engaging the holder with the paint can lid (as described above) and the bail is inserted in the slot, once the paint can is placed down on a surface, the holder is retained in its ready-to use position with the stem hand-grip nearly horizontal (0°-20° up from horizontal), and the bail tilted to one side from vertical. As in the case of the first embodiment of FIG. 1, a generally flat hammer surface 26 may be provided, in this second embodiment, on the outside of the transition portion 36 joining the stem 14 to the neck portion 18. The angular flare of the foot portion 16 is selected so that the angle of the plane of magnet 30 positions a paint brush, retained magnetically by its ferrule, over the paint can contents to catch any drips.

Figure 3:
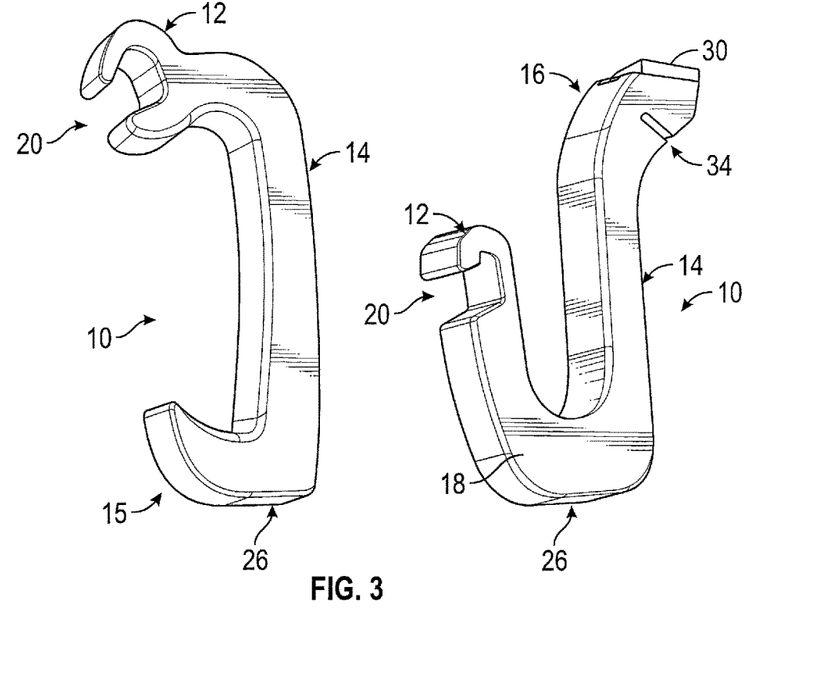
FIG. 3 is an isometric view showing both the QL and GM embodiments of the inventive paint can holder, in this view both are shown from the side opposite that shown in FIGS. 1 and 2.

FIG. 3 shows an isometric view of both embodiments of the inventive paint can holders 10 of FIGS. 1 and 2, QL on the left and GM on the right. In this illustration, the inventive holders are turned over to show the opposite side, with the jaw structure 20 of each pointing to the left. The features pointed out above are self-evident, and the parts are numbered as in FIGS. 1 and 2. In addition, this photo illustrates the thickness of the inventive holder implements, in the embodiment shown, planar solid aluminum material having a ¾" thickness.

Figure 4:
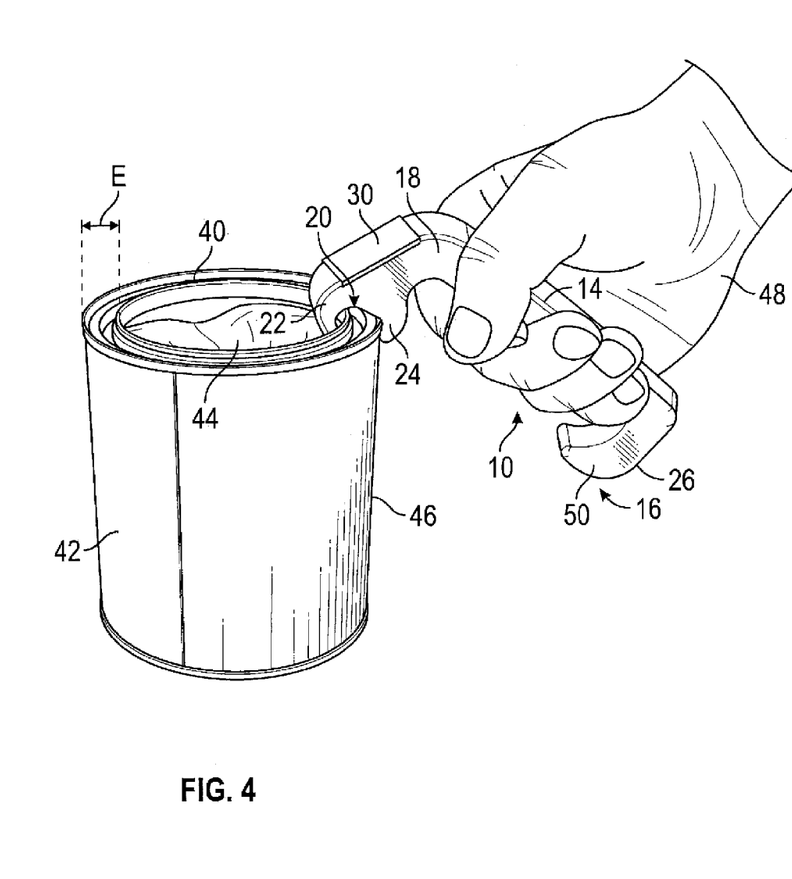
FIG. 4 is an isometric view showing the use of the Type QL embodiment of the inventive paint can holder with the jaw gripping the lip of a quart paint can in the use position.

FIG. 4 shows in a slightly elevated perspective view a QL holder of FIG. 1 in use. Note the jaw structure 20 is engaged over the upper, lid-engaging lip 40 of a Quart/Liter can 42 full of paint 44. Note that the upper lip 22 of the jaw engages the inner margin of lip 40, while the lower lip 24 engages the lip outer bead and/or vertical side 46 of the can. As can be seen, the stem 14 is of sufficient length to provide a comfortable, natural hand-grip for the user's hand 48. Note also that due to the oblique angle of the jaw center line, A (see FIG. 1), when the can is picked up, the can will be held tipped down from horizontal at an angle which permits full and unobstructed access to the paint 44 in the can 42. The hook-end 50 of the foot portion 16 prevents the stem from slipping out of the grasp of the user's hand 48. The throat width D of the jaw structure 20 (see FIG. 1) is sized slightly larger than the radial width of the can lip E so that there is a snug, frictional, locking fit of the can between the jaw projections 22, 24.

Figure 5:
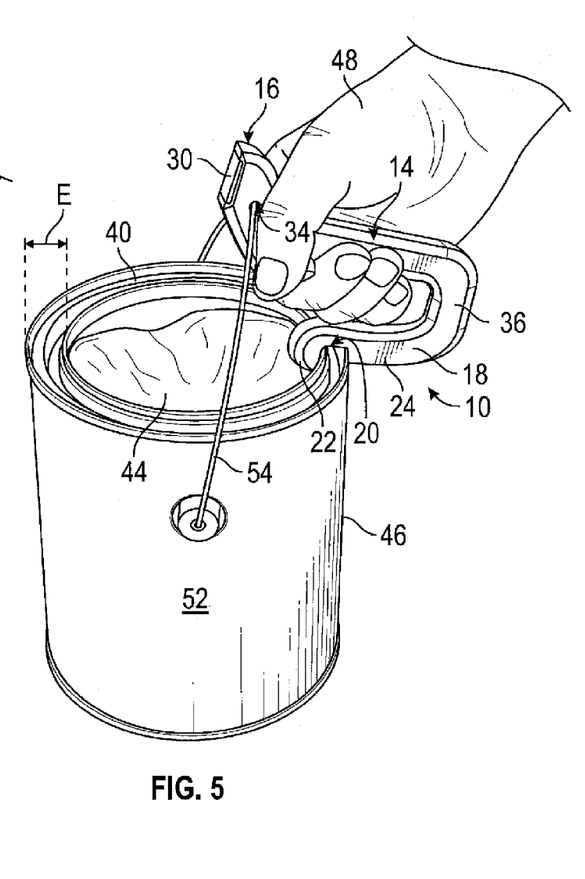
FIG. 5 is an isometric view showing the use of the Type GM embodiment of the inventive paint can holder with the jaw gripping the lip of a gallon paint can and the bail has been engaged in the bail slot while being held in the use position.

FIG. 5 shows in a slightly elevated perspective view of a GM holder of FIG. 2 in use. Note the jaw structure 20 is engaged over the upper, lid-engaging, lip 40 of a Gallon/Multi-Liter can 52 full of paint 44. Note that the upper lip 22 of the jaw engages the inner margin of lip 40, while the lower lip 24 engages the lip outer bead and/or vertical side 46 of the can. The stem 14 is of sufficient length to provide a comfortable, natural hand-grip for the user's hand 48. The can bail 54 is engaged in the bail slot 34. Together, as a result of the oblique orientation of the jaw structure axis A, together with the reverse curve of the foot end 16 and the angle of the bail slot 34 therein, the can is held tipped down from horizontal at an angle which permits full and unobstructed access to the paint 44 in the can 42, with the bail held fixedly out of the way so as to not obstruct brush access to the paint 44. The throat width D of the jaw structure 20 is sized slightly larger than the width of the can lip E so that there is a snug frictional locking fit of the can between the jaw projections 22, 24. The recurve of the end 50 of the foot portion 16 (best seen in FIG. 2), plus the bail 54 captured in the bail slot 34, prevents the user's hand 48 (thumb side) from slipping up and off the holder stem 14. Likewise, the transition portion 36 serves to capture the outside (little-finger side) of the user's hand 48 from slipping down and off the holder hand-grip stem 14. As with the quart can 46, the throat width D of the jaw structure 20 (see FIG. 2) is sized slightly larger than the radial width of the lip F of gallon can 52 so that there is a snug frictional locking fit of the can between the jaw lip projections 22, 24. One of skill in this art will appreciate that although the radial lip widths E and F shown in FIGS. 4 and 5, respectively, are, by industry standards, the same, in the event they are different, e.g., in Liter or Multi-Liter cans, the jaw widths D of the inventive holders will be sized appropriately for the cans being held.

Figure 6:
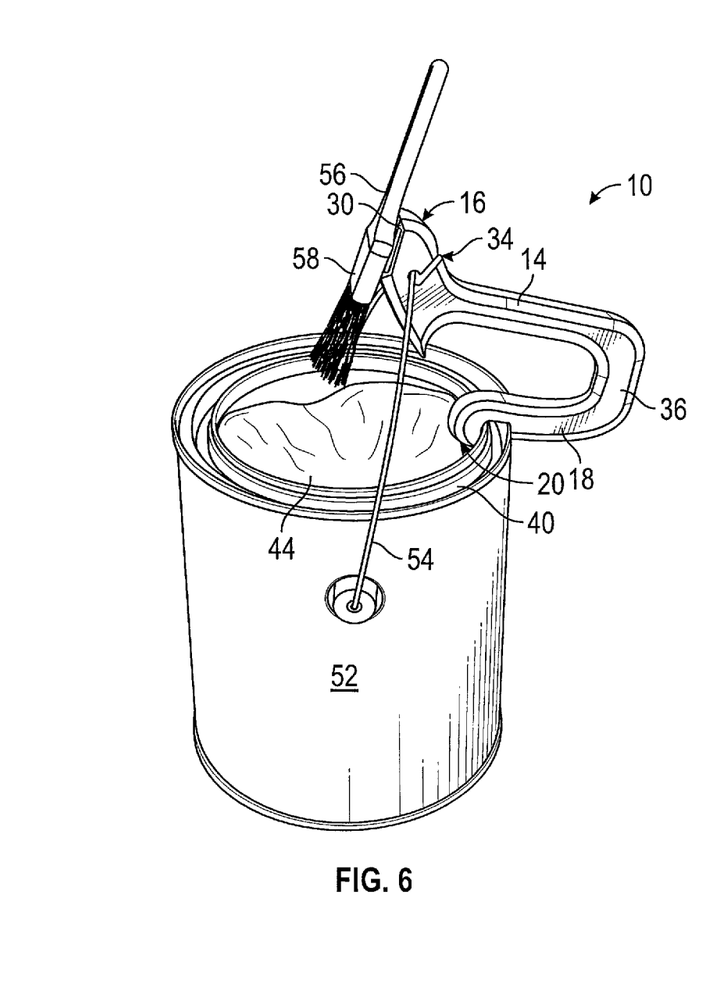
FIG. 6 is an isometric view showing the Type GM embodiment of the inventive paint can holder in a resting (set down) position ready to be picked-up, and showing a paint brush held by the magnet above the paint in position so excess paint drips back into the can.

FIG. 6 illustrates the use of the magnet 30 to hold a brush 56 by its ferro-magnetic metal ferrule 58 at an angle over the open paint can so that any paint on the brush bristles will drip into the paint 44. Note also that the inventive holder 10 is "free-standing"; that is, once hooked to the can 52, with the bail 54 engaged in the bail slot 34, the can may be set down, the holder 10 released yet stay locked onto the can. In addition, the bail will be held out of the way, with the brush 56 secured by the magnet 30 at a suitable oblique drip angle as a result of the reverse curve of the hook end 50 of the foot 16. Although not separately illustrated, the quart paint can 42 of FIG. 4 may likewise be set down on a surface and the stem 14 released by the hand, and the holder will stay engaged with the can lip and side of the can, in the angle shown in FIG. 4. Thus, both embodiments have the free-standing feature.

FIGS. 7-9D is a series of drawings showing the universal Type UC holder of this invention in both the "J-shape" and the "Oval-shape". FIGS. 8A-8D are a series showing use of the Type UC holder to engage and retain a quart paint can (size Q/L). FIGS. 9A-9D are a series showing use of the Type UC holder to engage and retain a gallon size paint can having a bail handle (size G/M).

Figure 7:
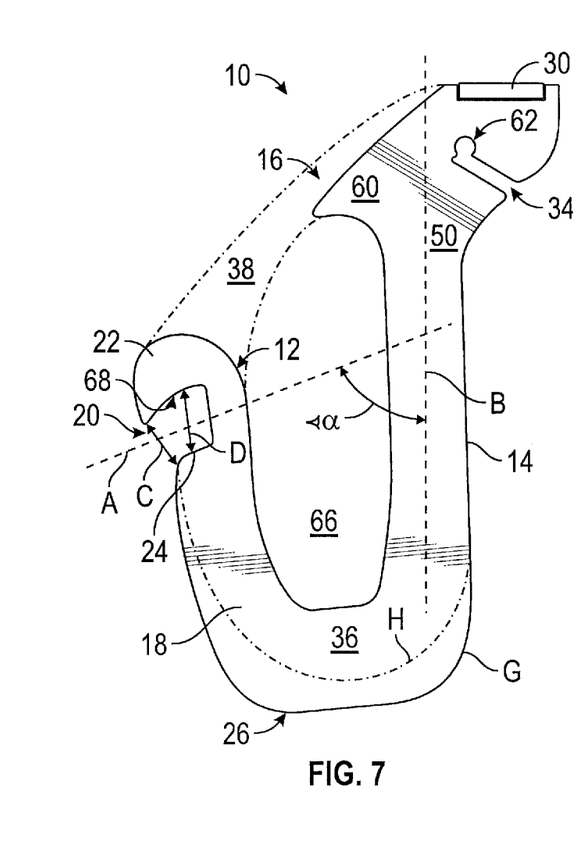
FIG. 7 is a plan or outline view of the universal Type UC holder, showing in solid outline a first embodiment "J-shaped" configuration and in dash-dot lines a second "Oval-shaped" embodiment configuration with a bridge and a thinner transition section.

FIG. 7 is a plan or outline view (in solid lines) of the profile of a first embodiment of the universal embodiment Type UC of the holder 10 in which the parts are numbered to correspond to those of the gallon/metric size holder G/M of FIG. 2. The foot portion 16 comprises a curved hook portion 50 which includes a spur or "beak" 60 configuration, as compared to the rounded configuration of FIG. 2. This spur functions as a finger stop as best seen in FIGS. 8B, 8D, 9B and 9D. In addition, the bail slot 34 terminates in an off-set, snap-in, rounded recess 62 that intersects with the end of the slot 34 but is off-set to one side. This recess 62, having an opening to the slot 34 that is less than the diameter of the bail 54, requires some pressure to force the bail from the slot 34 into place in the recess 62, hence the reference to it as a "snap-in" retainer. As such, the snap-in retainer provides a safety function in that the bail cannot be easily dislodged, and the holder stays in place when the paint can is placed down and the user's hand is removed from the stem portion 14.

In this first UC embodiment, the configuration of the jaw opening 20 is a variation of that shown in FIGS. 1-6 without being functionally different. As best shown in FIG. 7, the jaw opening C is narrower than the back face D since the opening C need only be wide enough to permit fitting over the vertical height (or thickness) of the can lip or sealing rim 40, while the back face D has to be wide enough to span the radial width of the can lip (rim), that is the annulus of the can lip (rim structure). The back face D in this embodiment is somewhat simplified, being generally straight, whereas in the FIGS. 1-6 embodiments, the back face is arcuate ("gable" shaped in profile). These differences in configurations of the jaw lips 22, 24 to form the opening 20 simply illustrate by way of example, a range of configurations that may be made without departing from the principles of the invention.

It is an important principle of the invention that the width C is selected to correspond to the vertical height or thickness of the particular can lip (rim), the width D selected to fit the width of the can lip (rim), and the inner surface 68 of the upper jaw 22 is curved or angled to permit clearance of the inner edge of the can's ring-type lip (rim) when rotating the holder to lock the can rim into the back of the throat, D. Since the opening 20 of the jaw, C, is smaller than the width of the can rim-type lip, the can lip (rim) cannot slip out the opening 20. Only by rotating the inventive handle 10 to unlock the can lip (rim), clockwise as seen in FIGS. 7-9D or counterclockwise as seen in FIGS. 1-6, in both cases the stem 14 toward the interior of the can, will the handle be released from the can lip (rim). The opposite motion permits the inventive handle 10 to be locked onto the can lip (rim). Thus, the can lip (rim structure) 40 is locked into the back of the throat D jaw 20 by the rotation of the handle 10 and cannot slip out in ordinary use.

FIG. 7 also shows a second embodiment of the Type UC handle 10 which includes in dash-dot lines a bridge section 38 spanning between the head structure 22 and the foot structure 16. The bridge results in formation of a hand-hole 66, and this configuration can be described as generally oval. In addition it strengthens the handle 10 so that not all the lifting strain is on the transition section 36. In the first, J-shaped, embodiment of the Type UC handle described above, the solid line G shows an exemplary configuration. When the bridge structure 38 is employed in the second, Oval-shaped, embodiment of this Type UC handle, the transition 36 can be slimmed-down as the weight of the full paint can is distributed between both the transition 36 and the bridge 38. These different configurations also illustrate by way of example the wide range of configurations that can be employed within the scope of the principles of the invention.

Figure 8A:
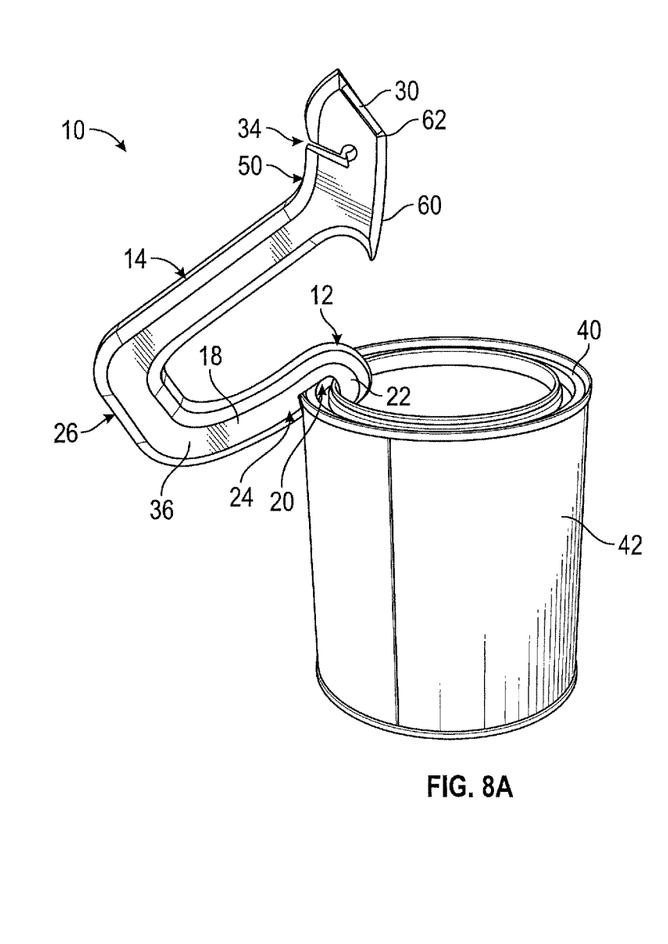
FIG. 8A showing the Type UC engaged on a quart/liter can resting on a surface.
Figure 8B:
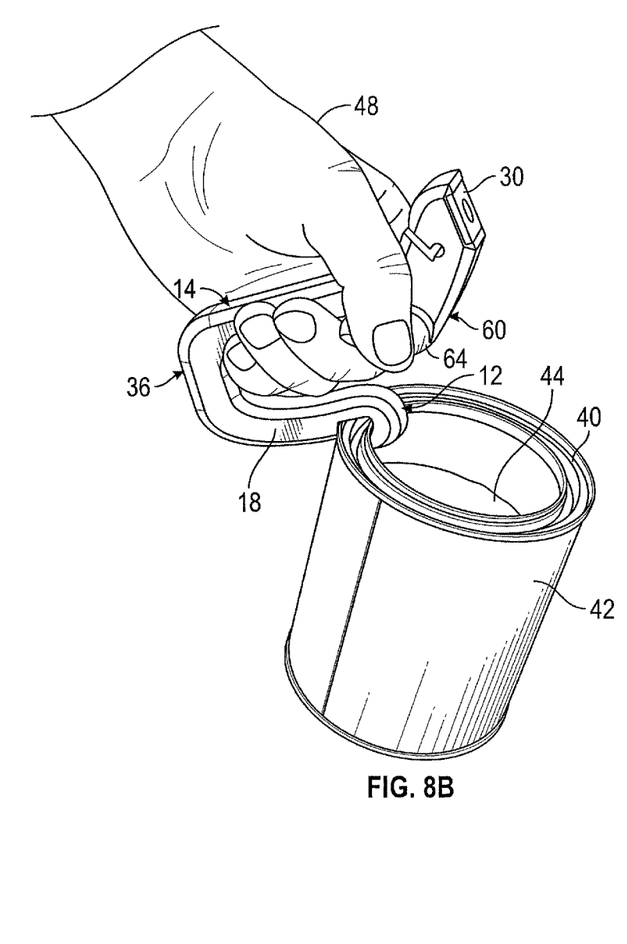
FIG. 8B showing the can being lifted by the handle by a user.
Figure 8C:
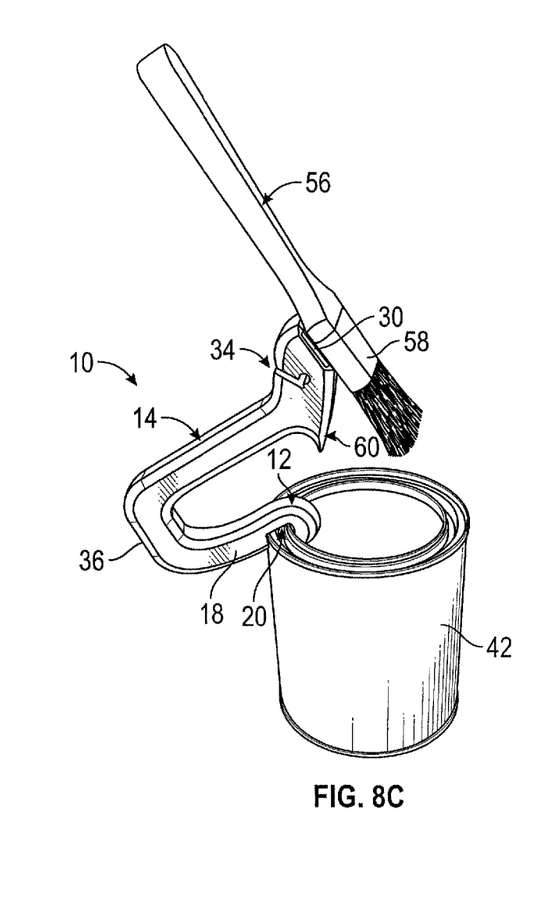
FIG. 8C showing the can resting on a surface with a paint brush engaged by the magnet so that it drips into the can.
Figure 8D:
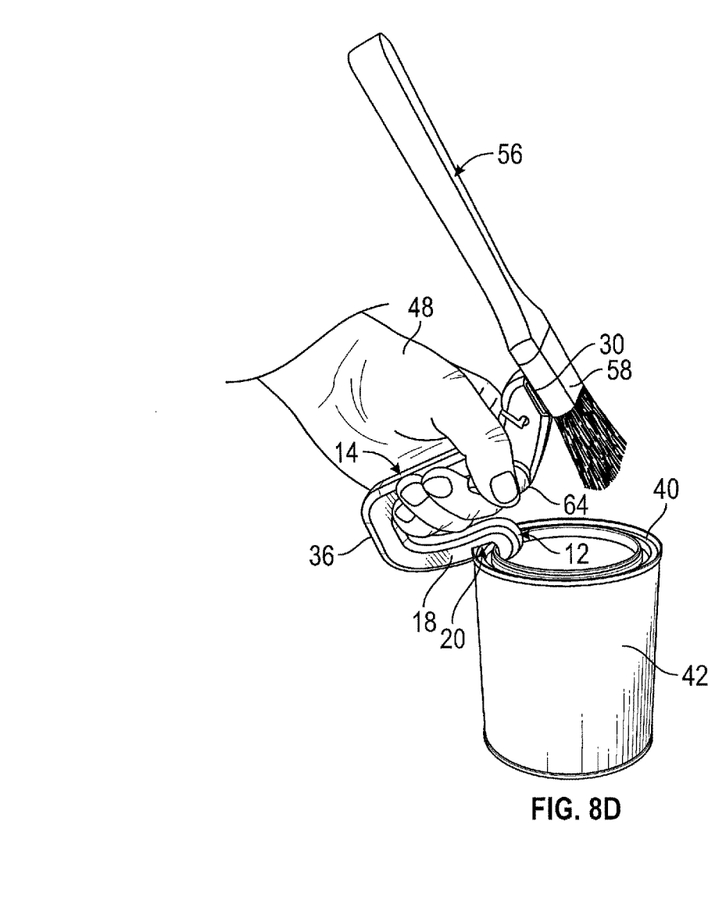
FIG. 8D showing the can and brush being lifted by a user with the brush retained by the magnet.

FIG. 8A shows the inventive universal Type UC handle 10 locked onto the lip 40 of a quart can in position to be picked up by a user, which is then shown picked-up by hand 48 of a user in FIG. 8B. Note the first finger is engaged by beak 60 which provides a positive anti-slip retaining function. FIG. 8C shows the universal Type UC handle 10 locked onto the lip 40 of a quart can and with a brush 56 retained in position to drip into the can by the magnet 30 retaining the brush via ferrule 58. Note the ferrule 58 is long enough so that it can be slid up the magnet 30 to insure the bristles drip into the can and not on the lip. FIG. 8D show the can 42 and brush 56, magnetically held by ferrule 58 on magnet 30), can be picked up by user 48; again note the functional stop by the beak 60 against the finger 64. This shows that the painter can park the brush on the holder during painting without having to put either the can or the brush down. That feature is particularly useful when a painter is up on a ladder and needs to park the brush yet has no tray or other place to put it. Note FIGS. 8A and 8C show that the inventive holder stays in place when the user releases the hand-grip stem portion 14 to set the can of paint down on a surface, whether a brush is being retained or not.

Figure 9A:
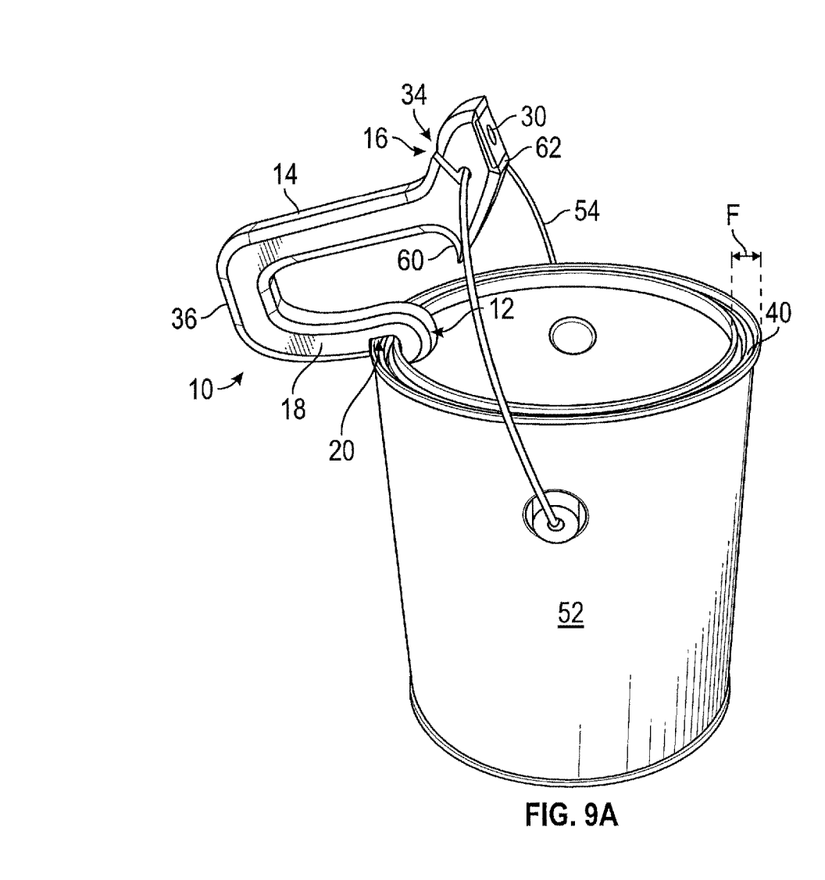
FIG. 9A showing the Type UC engaged on a gallon/multi-liter can resting on a surface with the can bail being engaged in the bail slot.
Figure 9B:
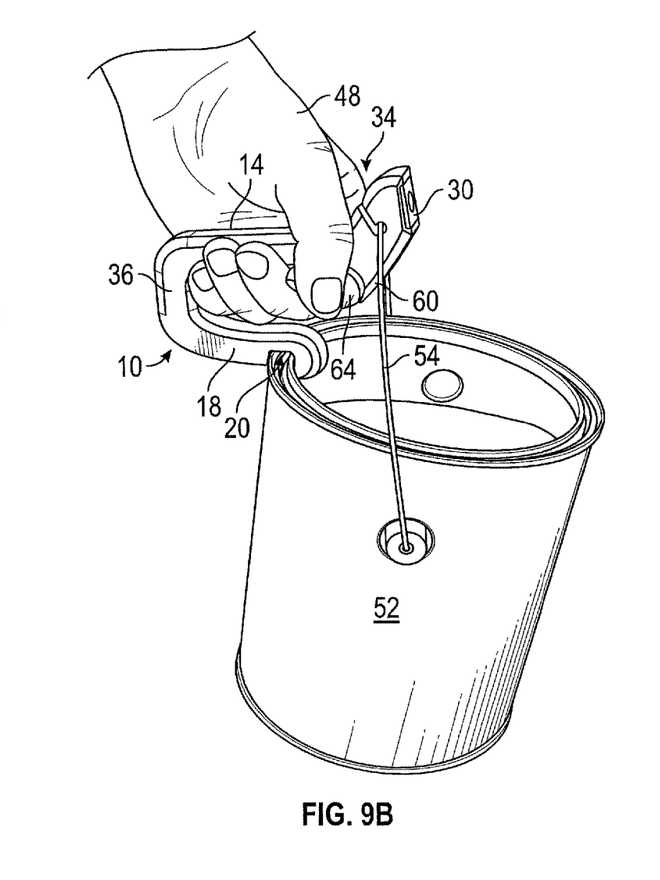
FIG. 9B showing the can being lifted by the handle engaging the lip and bail.
Figure 9C:
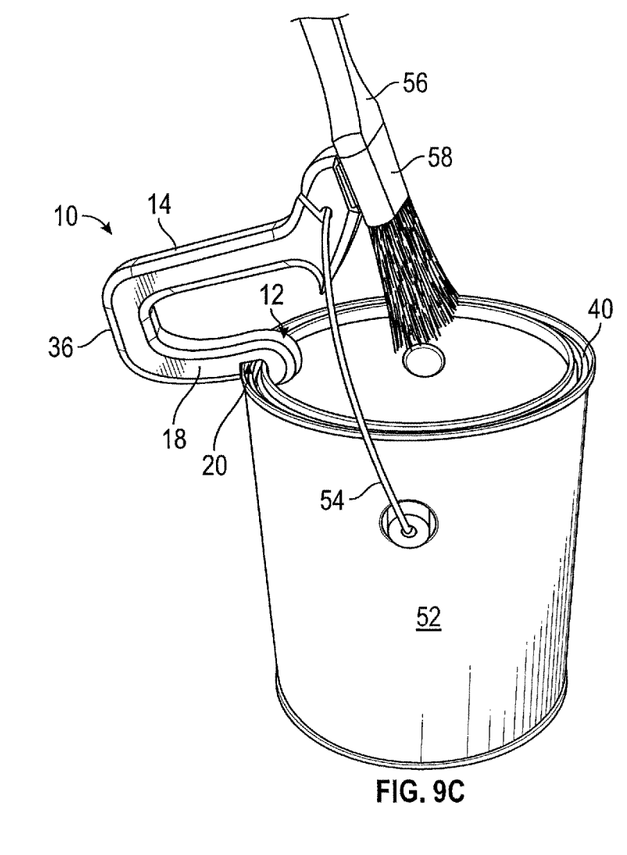
FIG. 9C showing the can resting on a surface with a paint brush engaged by the magnet so any drips fall into the can.
Figure 9D:
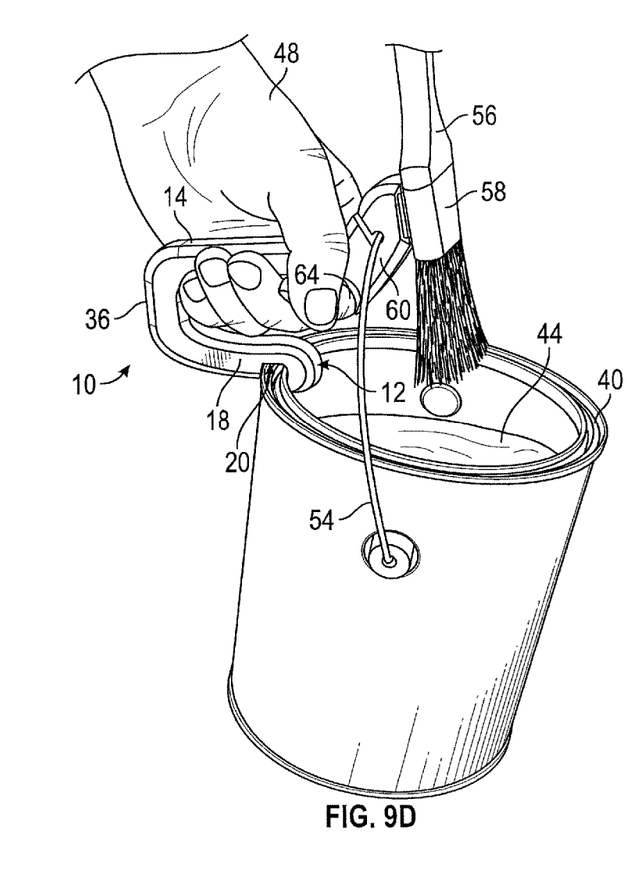
FIG. 9D showing the can and brush being lifted by a user with the can retained at the lip and by the bail, and the brush being retained by the magnet.

FIG. 9A shows the inventive universal Type UC holder 10 in use with a gallon sized-can 52, in which the bail 54 has been snapped-into the keeper recess 62 of the bail slot 34. FIG. 9A shows the can 52 resting on a surface with the handle free-standing, locked in place. FIG. 9B shows the can lifted by the inventive Type UC holder. FIG. 9C shows the can at rest on a surface while retaining a brush 56 via the ferrule 58 engaging the magnet 30, again free-standing locked into place on the paint can. The angle of the upper foot surface (see FIG. 7) is selected to insure the paint brush bristles point down into the can as seen in FIGS. 9C and 9D so that excess paint drips off the bristles back into the paint can, either at rest on a surface (FIG. 9C) or when lifted by hand 48 (FIG. 9D). FIG. 9D show the beak 60 functioning as a stop for finger 64 to assist in lifting the can; this feature is particularly useful for the gallon/multi-liter sized cans which are very heavy when full.

FIGS. 1, 2 and 7 illustrate that the Angle α defined between the axis of the jaw opening 20 and the axis of the stem 14 is an acute angle, but may be varied widely, shown by way of example in the range of about 45°-75° in FIGS. 1, 2 and 7, respectively, and generally ranges from about 30° to about 80°.

INDUSTRIAL APPLICABILITY

It is clear that the inventive paint can holders of this application have wide applicability to the paint and painting industries, particularly for brush-applied painting. The inventive holders clearly provide features and benefits to painters not heretofore available. Thus, the inventive paint can holders have the clear potential of becoming adopted as the new standard for paint can handling aids, including convenience and reduction of fatigue during brush painting.

It should be understood that various modifications within the scope of this invention can be made by one of ordinary skill in the art without departing from the spirit thereof and without undue experimentation. For example, the lengths of the stem portions can be varied to suit the hands of the intended users, women as compared to men, including providing desired or suitable ergonomic grip contours along the interior of the surface of the stem portion 14. Likewise, the configurations of the curves and re-curves of the head, jaws, neck, stem, foot and transition portions may be widely varied provide the functionalities disclosed herein. This invention is therefore to be defined by the scope of the appended claims as broadly as the prior art will permit, and in view of the specification if need be, including a full range of current and future equivalents thereof.

The invention claimed is:

1. A paint can holder for manually holding and lifting paint cans ranging in size from quart to gallon size, or their corresponding metric equivalents, said cans having a ring-type rim forming a lip for receiving in sealing engagement, pry-off type lids, said holder comprising in operative combination:
   a) a generally planar body consisting of durable plastic and having a generally rectangular cross section, said body being configured as a one-piece ergonomic handle having a C-shaped jaw structure that hooks-over, engages and locks-onto only said ring-type rim of a paint can, said body having a width in the range of from ⅜ inch to 1 inch so that said jaw has area contact, rather than point contact, with said can rim to prevent the can from pivoting from side to side while being held by said holder;
   b) said planar body including a head portion in which said C-shaped jaw structure is disposed, said jaw structure consisting of an upper and a lower lip configured to retainingly engage an upper, ring-type rim structure of a paint can, said ring-type rim having a vertical height less than a horizontal width;
      i. said jaw structure having an entrance opening only wide enough to permit insertion over said vertical height of said ring-type rim but not over the horizontal width of said ring-type rim;
      ii. said jaw structure having a throat depth greater than the vertical height of said ring-type rim, and the back of the throat having a width selected to provide a snug, locking engagement with the width of the ring-type rim when said jaw structure is rotated to engage said lower lip with the outer edge of said can rim to permit the paint can to be set down without the handle becoming dis-engaged from said pain can rim;
      iii. said jaw structure upper lip having a generally arcuate inner surface shape from opening to throat depth so that when the ring-type lip is engaged in the jaw throat, the upper jaw lip projects toward an interior surface of said paint can;
      iv. said jaw structure being oriented in said holder so that in use, said paint can is held tipped down from the horizontal at an angle which permits full and unobstructed access to the paint in the can;
   c) said planar body including a stem portion forming an ergonomic hand-grip, said stem portion being disposed spaced from said head portion and opposite said jaw structure entrance;
   d) said stem hand-grip portion extending to a foot portion, said stem hand-grip portion being medial between said head and said foot portions and said stem portion hand-grip is ergonomically configured to a user's hand, said width providing a full hand grip when the user's hand is closed over said stem portion; and
   e) said planar body includes a flattened outside surface serving as a hammer to reseal a lid to said ring-type rim of said paint can, and a magnet to retain a ferromagnetic ferrule of a paint brush, said magnet being planar and oriented with the plane of the magnet pointing toward the interior of the paint can when the holder is in use and when set down at rest on a surface to retain and orient said paint brush over the open can of paint to catch any drips from the bristles of said brush.

2. A manual paint can holder as in claim 1 wherein said planar body is configured in a shape, as seen in plan view, selected from an oval, a C-shape and a J-shape.

3. A manual paint can holder as in claim 2 wherein said foot portion includes a bail slot into which a paint can bail may be engaged.

4. A manual paint can holder as in claim 3 wherein said bail slot includes a snap-in recess.

5. A manual paint can holder as in claim 2 wherein said flattened outside surface serving as a hammer to reseal a lid to said ring-type rim of said paint can is disposed on a transition portion between said head portion and said stem portion.

6. A manual paint can holder as in claim 2 wherein said magnet is disposed on said foot portion.

7. A manual paint can holder as in claim 2 wherein said body is generally an oval shape, said oval shape having opposed, spaced long sides including a first long side forming a neck portion and a second long side forming a stem portion, said oval shape having opposed, spaced end portions joining said long side neck and stem portions, a first said end portion forming a bridge between said head and said foot portions, and a second end portion forming a transition between said stem and said neck portions, said stem long side forming a hand-grip, said jaw is disposed on the first long side opposed to said second, hand-grip stem long side and adjacent one end of said oval, and said foot portion is disposed on said long side forming said hand-grip and adjacent the same end as the jaw structure but spaced from said jaw structure.

8. A manual paint can holder as in claim 7 wherein said foot portion includes a bail slot.

9. A manual paint can holder as in claim 8 wherein said magnet is disposed on said foot portion to retain and orient said paint brush over the open can of paint to catch any drips from the bristles of said brush.

10. A manual paint can holder as in claim 9 wherein said flattened outside surface serving as a hammer to reseal a lid to said ring-type rim of said paint can is disposed on said second end portion.

11. A manual paint can holder as in claim 2 wherein said body is generally a J-shape, having an elongated neck portion terminating in an upper head portion having said jaw structure, a spaced elongated stem portion forming a hand-grip and terminating in an upper, foot portion that is flared away from said head portion, said stem portion and said neck portion being joined by a transition portion at the bottom of said stem and neck portions, together said head, neck, transition, stem and foot portions forming said J-shape.

12. A manual paint can holder as in claim 11 wherein said foot portion includes a bail slot.

13. A manual paint can holder as in claim 12 wherein said magnet is disposed on said foot portion.

14. A manual paint can holder as in claim 12 wherein said flattened outside surface serving as a hammer to reseal a lid to said ring-type rim of said paint can is disposed on said transition portion joining said neck portion to said stem portion.

15. A manual paint can holder as in claim 2 wherein said body is generally a C-shape, having at its upper end a bent-forward neck portion terminating in a head portion having said jaw structure, a spaced elongated stem portion forming a handgrip and terminating at its bottom end in a foot portion that is flared forward to form a hook, together said head, neck, stem, foot and hook portions forming said C-shape, said stem being configured long enough to comfortably engage the fingers of a user between said neck and said hook.

16. A manual paint can holder as in claim 15 wherein said head portion includes a magnet to retain a ferromagnetic ferrule of a paint brush, said magnet being disposed on said head portion to retain and orient said paint brush over the open can of paint to catch any drips from the bristles of said brush.

17. A manual paint can holder as in claim 16 wherein said foot portion includes a flattened outside surface serving as a hammer to reseal a lid to said ring lip of said paint can.

18. A manual paint can holder as in claim 1 which includes a flange projecting from at least one of a foot, stem or transition portion in a length permitting use as a paint can lid opener.

19. A manual paint can holder as in claim 2 wherein the angle included between the axis of said stem portion and the opening of said jaw ranges from about 30° to about 80°.

* * * * *